United States Patent Office 3,644,470
Patented Feb. 22, 1972

3,644,470
PROCESS FOR PRODUCING NITRILES
Stanley D. Turk and Ralph P. Williams, Bartlesville,
Okla., assignors to Phillips Petroleum Company
No Drawing. Filed Jan. 14, 1969, Ser. No. 791,153
Int. Cl. C07c 121/02, 121/10, 121/12
U.S. Cl. 260—465 B
7 Claims

ABSTRACT OF THE DISCLOSURE

Tetrahydrothiophene-1,1-dioxides (sulfolanes) are employed as reaction media for conversion of ammonium aromatic carboxylates to aromatic nitriles.

---

This invention relates to a process of preparing nitriles and has for an object the provision of a process for converting ammonium carboxylates and related compounds to nitriles.

It is known in the prior art to produce aromatic nitriles by the thermal dehydration of the ammonium salts of aromatic carboxylic acids. However, these prior art processes present certain problems in conversion and recovery of the desired product. For example, the prior art processes have resulted in side reactions which are wasteful of reactants and which present difficulties in separation of the desired product from the reaction mixture. More specifically, charring of the reaction mixture has been a problem at the temperatures involved and the separation of water of dehydration produced in the process has been difficult. Mixtures of amido ammonium carboxylates, diamides, amidonitriles, and the like, which are often formed in addition to the nitriles decrease the yields of the desired product and add to the separation problems. Likewise aromatic nitriles produced by such prior art methods have been difficult to separate from the total reaction product by ordinary means.

Accordingly, a further object of this invention is the provision of a process for the production of aromatic nitriles by the thermal dehydration of ammonium aromatic carboxylates under conditions to minimize the high temperature charring of the reactants.

A further object of the invention is the provision of a process by which water of dehydration is smoothly removed from the reaction mixture with minimum loss of solvent and reactants.

A further object of this invention is the provision of a process in which the nitrile is easily recovered by simple distillation of the reaction mixture at atmospheric pressure.

A still further object of this invention is the provision of a process in which the purity of the nitrile product is enhanced.

A still further object of this invention is the provision of a process in which the solvent used for reaction may be readily recovered and recycled to the system.

Further and additional objects will appear from the following description.

In accordance with one embodiment of this invention, the thermal dehydration of an ammonium salt of an aromatic carboxylic acid, preferably in the presence of ammonia, is carried out at dehydrating temperatures utilizing a sulfolane as a solvent for the reaction. Thus, in accordance with this invention the compounds to be converted to the nitrile are dissolved or otherwise suspended in the sulfolane and subjected to the elevated temperatures in the presence or absence of a suitable catalyst. The sulfolanes that are suitable for use in accordance with the process of this invention are the tetrahydrothiophene-1,1-dioxides which have the following generic formula:

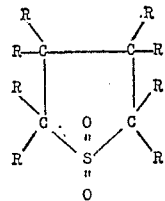

wherein R is from the group consisting of hydrogen, alkyl having from 1 to 8, inclusive, carbon atoms, and alkoxy having as many as 12 carbon atoms; wherein not more than one R is alkoxy; and wherein the total number of carbon atoms in the sulfolane molecule is not in excess of 20. The preferred solvent for the dehydration reaction is sulfolane per se which is the unsubstituted tetrahydrothiophene-1,1-dioxide. However, it is within the purview of this invention to employ other sulfolanes in which the carbon atoms may be substituted with alkyl or alkoxy groups, all as previously indicated. These substituted compounds have much the same physical characteristics as sulfolane per se. Likewise, mixtures of the various indicated sulfolanes may be employed.

Examples of suitable tetrahydrothiophene-1,1-dioxides include:

tetrahydrothiophene-1,1-dioxide,
3-methoxytetrahydrothiophene-1,1-dioxide,
3-dodecyloxytetrahydrothiophene-1,1-dioxide,
2-hexyloxytetrahydrothiophene-1,1-dioxide,
2,5-dioctyltetrahydrothiophene-1,1-dioxide,
3,4-diethyl-2,5-dioctyltetrahydrothiophene-1,1-dioxide,
2-methyltetrahydrothiophene-1,1-dioxide,
3-ethyltetrahydrothiophene-1,1-dioxide,
3,4-diethyltetrahydrothiophene-1,1-dioxide,
3-octyltetrahydrothiophene-1,1-dioxide,
2(3-ethylpentyl)tetrahydrothiophene-1,1-dioxide and the like.

The aromatic ammonium carboxylates that may be dehydrated to produce the nitriles in accordance with this invention are those aromatic compounds having the formula:

$$R'(\text{COONH}_4)_n$$

wherein $n$ is an integer of 1 to 4, inclusive; wherein R' is an aromatic six membered ring radical having a valence of $n$; wherein R' may or may not be alkyl substituted at one or more positions on the ring; and wherein, in the event R' is alkyl substituted, each alkyl group contains not more than 4 carbon atoms and the total number of carbon atoms in all said alkyl groups does not exceed 12.

Examples of ammonium carboxylates which can be employed according to the process of this invention include:

diammonium terephthalate,
diammonium phthalate,
diammonium isophthalate,
ammonium benzoate, triammonium, 1,3,5-benzenetricarboxylate,
triammonium 1,2,4-benzenetricarboxylate,
tetraammonium 1,2,4,5-benzenetetracarboxylate,
ammonium 2,3,5-tributylbenzoate,
ammonium 4-methylbenzoate,
triammonium 3,4,6-tributyl-1,2,5-benzenetricarboxylate,
diammonium 2,5-dimethylterephthalate,
tetraammonium 3,6-dimethyl-1,2,4,5-benzenetetracarboxyylate and the like.

Thus, the process of the invention is applicable to the ammonium mono-, di-, tri- and tetracarboxylates. The invention is particularly suitable for the treatment of the dicarboxylates and especially those in which the R' group is a p-phenylene group wherein the desired product consequently is terephthalonitrile (benzene 1,4-dicarbonitrile). The process involves the conversion of the appropriate ammonium salts to the nitrile by dehydration, as will be understood. However, it will be apparent that the process is equally applicable to the corresponding amides and imides, and, if ammonia is added to the system, the process may be carried out by utilizing the free acid or its anhydrides as the initial reaction compound, the ammonium salt being formed in situ as an intermediate for the dehydration step.

In carrying out the process of the invention, the tetrahydrothiophene-1,1-dioxide employed may comprise from about 10 weight percent to as much as 98 weight percent and the reaction mixture. Usually the tetrahydrothiophene-1,1-dioxide is present in the range of about 20 to 90 weight percent of the reaction mixture.

Reaction temperatures for carrying out the appropriate dehydration are usually in the range of about 250 to 300° C. but preferably temperatures in the range of 260 to 290° C. are employed. Pressure sufficient to maintain the reactants and the media substantially completely in the liquid phase are usually satisfactory. Accordingly, atmospheric pressure is usually the most convenient. The time necessary for carrying out the reaction to obtain the desired degree of conversion may vary within the range of about ten minutes to about 48 hours.

If desired, a dehydration catalyst may be employed in the reaction mixture along with the sulfolane solvent. In effect any dehydration catalyst known to the art may be used which does not deleteriously affect the conversion process of this invention. Suitable catalysts are phosphoric acid, fused mixed oxides of boron and phosphorus, oxides of zirconium, beryllium, tungsten and vanadium, basic aluminum phosphate, and basic aluminum sulfate. If used, the catalyst is usually present in the amount of from about 0.1 to about 10 parts by weight of catalyst for each 100 parts by weight of the ammonium carboxylate undergoing dehydration.

In carrying out the process of the invention, the appropriate aromatic carboxylate or related compound is suspended in the selected sulfolane and subjected to a dehydration temperature usually in the presence of added ammonia. During the course of the reaction, water is smoothly distilled from the reaction mixture and after the desired degree of conversion has been effected, the temperature is raised somewhat to permit the simultaneous distillation of the nitrile and the sulfolane, it having been found that these two components will co-distill, the temperature of co-distillation of sulfolane per se and terephthalonitrile being in the range of about 280° to 290° C. at atmospheric pressure. When cooled, the nitrile precipitates from the sulfolane and may be readily separated. The sulfolane may be recycled to the process and the separated nitrile may be washed with water, ethanol, ether and then vacuum dried to produce a product having a high degree of purity.

The aromatic nitriles produced in accordance with the process of this invention can readily be converted to the corresponding amines, for example, terephthalonitrile may be readily converted to p-xylylenediamine. This latter compound is useful as a curative for epoxy resins, in the synthesis of non-yellowing polyurethanes, and in the synthesis of nylons useful to fabricate fibers and adhesives.

EXAMPLE 1

A total of 166 g. (1.0 mole) of terephthalic acid was dissolved in a warm solution of 1235 g. of 5.5 percent aqueous ammonia. The resulting solution was charged to a reactor and concentrated to dryness. A yield of 198.5 g. of diammonium terephthalate resulted. This diammonium terephthalate was then suspended in 1500 ml. of sulfolane (tetrahydrothiophene-1,1-dioxide); 6.2 g. of polyphosphoric acid was added, and the mixture was heated to 260° C. whereupon the solid dissolved and water began to distill off. Heating was continued at 270-275° C. for seven hours, while a slow stream of anhydrous ammonia was bubbled through the solution. The resultant mixture was then distilled under ammonia vapor at 280-290° C. at atmospheric pressure and a pot residue of only 16.7 g. remained. The resulting distillate was cooled to room temperature and the white precipitate which formed was filtered off, washed with ethanol and ether, and vacuum dried. A yield of 101.7 g. of terephthalonitrile (M.P. 223–224° C.) was recovered. The filtrate was concentrated to about 100 ml. and subsequently diluted with water to yield 0.5 g. of additional product. The combined terephthalonitrile products were stirred in suspension in 4 N ammonium hydroxide for one hour, filtered and the precipitate was washed with water, ethanol, ether and then vacuum dried. A total of 97.0 g. of terephthalonitrile was recovered, which constituted a 75.7 mole percent yield based on the terephthalic acid employed. The infrared spectrum of this product was identical to that of an authenic sample of terephthalonitrile.

EXAMPLE 2

This example demonstrates the conversion of terephthalonitrile produced according to the process of Example 1 and to another material of well-known utility, i.e., xylylenediamine, and further identifies the product formed in that examples as terephthalonitrile.

A total of 121.5 g. (0.95 mole) of terephthalonitrile produced according to the process of Example 1, 300 g. of methanol and 48 g. of Raney nickel composition (W. R. Grace Co., Grade #28, 50:50 nickel:water) were charged to a 1600 ml. reactor, chilled with Dry Ice-acetone mixture. The reactor was then charged with 80 g. of ammonia in the liquid phase, purged with hydrogen (while cold) three times, and charged with 800 p.s.i. of hydrogen while still cold. The reactor was then sealed and allowed to slowly warm to 95° C. over a three hour period. While warming, the reactor was recharged with hydrogen to 1140 p.s.i. on two occasions. The resultant product was filtered to remove catalyst and concentrated to 117.9 g. The resultant product was distilled to yield 101.9 g. of p-xylylenediamine which constituted a 79 percent yield.

The p-xylylenediamine produced was subsequently converted to p-xylylenediisocyanate by means of a conventional phosgene reaction in a 90 mole percent yield.

While particular embodiments of this invention are described above, it will be apparent that many modifications may be made without departing from the spirit and scope of the appended claims.

What is claimed is:

1. In the process for producing aromatic nitriles by heating under dehydration conditions an aromatic carboxylic acid having the formula R'$\pm$(COOH)$_n$ wherein $n$ is an integer of 1 to 4 inclusive, R' is an aromatic six membered ring radical having a valence of $n$, and wherein R' may be alkyl substituted, each alkyl group containing not more than 4 carbon atoms and the total number of carbon atoms in all said alkyl groups not exceeding 12, or the corresponding anhydride, amide, imide or ammonium salt thereof, the improvement which consists in employing as a solvent a sulfolane having the formula:

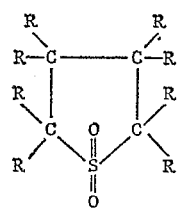

wherein R is from the group consisting of hydrogen, alkyl having from 1 to 8, inclusive, carbon atoms, and alkoxy having as many as 12 carbon atoms; wherein not more than one R is alkoxy; and wherein the total number of carbon atoms in the sulfolane molecule is not in excess of 20.

2. In the process for the conversion to an aromatic nitrile of an ammonium aromatic carboxylate having the formula:

wherein $n$ is an integer of 1 to 4 inclusive, and wherein R' is an aromatic six membered ring radical having a valence of $n$, and wherein R' may be alkyl substituted, each alkyl group containing not more than 4 carbon atoms and the total number of carbon atoms in all said alkyl groups not exceeding 12, by heating said carboxylate under dehydrating conditions the improvement which consists in employing as a solvent a sulfolane having the formula:

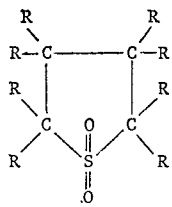

wherein R is from the group consisting of hydrogen, alkyl having from 1 to 8, inclusive, carbon atoms, and alkoxy having as many as 12 carbon atoms; wherein not more than one R is alkoxy; and wherein the total number of carbon atoms in the sulfolane molecule is not in excess of 20.

3. The process of claim 2 wherein the carboxylate is an ammonium phthalate.

4. The process of claim 2 wherein the carboxylate is ammonium terephthalate.

5. A process of preparing terephthalonitrile which comprises heating ammonium terephthalate in the presence of a dehydration catalyst to between about 250 and 300° C. in the presence of sulfolane as a solvent.

6. The process of claim 5 in which the reaction mixture is subjected to distillation to remove the nitrile product and sulfolane as overhead distillate and cooling said distillate to separate the nitrile product as a precipitate from the sulfolane.

7. The process of claim 6 wherein the heating and distillate step are effected in the presence of added ammonia.

References Cited

UNITED STATES PATENTS 3,131,209   4/1964   King   260—465
3,468,763   9/1969   Pugach   203—48

ALEX MAZEL, Primary Examiner

D. H. TORRENCE, Assistant Examiner

U.S. Cl. X.R.

303—58; 260—465 H

UNITED STATES PATENT OFFICE
CERTIFICATE OF CORRECTION

Patent No. 3,644,470     Dated February 22, 1972

Inventor(s) Stanley D. Turk and Ralph P. Williams

It is certified that error appears in the above-identified patent and that said Letters Patent are hereby corrected as shown below:

Column 1, line 72, to column 2, line 1, "tetrahydrothoiphene" should be -- tetrahydrothiophene --.

Column 3, line 17, "and" should be -- of --.

Column 3, between lines 65 and 66 insert this paragraph:

-- For a more complete understanding of this invention, reference will now be made to the following specific examples: --.

Column 4, line 27, "examples" should be -- example --.

Column 5, line 6, Correct formula.

$R'(CONH_4)_n$ should be -- $R'(COONH_4)_n$ --.

Signed and sealed this 18th day of July 1972.

(SEAL)
Attest:

EDWARD M. FLETCHER, JR.
Attesting Officer

ROBERT GOTTSCHALK
Commissioner of Patents